United States Patent [19]

Ellesson et al.

[11] Patent Number: 6,101,541
[45] Date of Patent: Aug. 8, 2000

[54] ACTIVE POLLING BY NETWORK LDAP DIRECTORY

[75] Inventors: Edward James Ellesson, Apex, N.C.; Sanjay Damodar Kamat, Ossining, N.Y.; Arvind Krishna, Somers, N.Y.; Rajendran Rajan, Bronx, N.Y.; Dinesh Chandra Verma, Millwood, N.Y.

[73] Assignee: International Business Machines Corporation, Armonk, N.Y.

[21] Appl. No.: 09/063,806

[22] Filed: Apr. 21, 1998

[51] Int. Cl.[7] ................................................. G06F 13/00
[52] U.S. Cl. .......................... 709/225; 709/202; 709/223; 709/313
[58] Field of Search .................................... 709/201, 202, 709/203, 207, 213, 217, 218, 219, 220, 223, 225, 226, 313; 707/9, 10, 100, 104

[56] References Cited

U.S. PATENT DOCUMENTS

| | | | |
|---|---|---|---|
| 5,644,711 | 7/1997 | Murphy | 713/202 |
| 5,740,231 | 4/1998 | Cohn et al. | 379/88.22 |
| 5,802,510 | 9/1998 | Jones | 707/2 |
| 5,893,116 | 4/1999 | Simmonds et al. | 707/201 |
| 5,968,121 | 10/1999 | Logan et al. | 709/219 |

*Primary Examiner*—Viet D. Vu
*Attorney, Agent, or Firm*—Ohlandt, Greeley, Ruggiero & Perle, LLP

[57] ABSTRACT

The present invention is an apparatus for controlling client node access to data items maintained in a storage device. The data items include volatile data items. The apparatus comprises a communication device for communicating with multiple client nodes; and a processor, coupled to the storage device for polling the client nodes to exchange (e.g., retrieve and/or transmit) data related to the volatile data items, via the communication device. The processing system further controls client node access to the data items of the storage device. In this way, the apparatus and method of the present invention remedies the problems associated with directory server overload.

20 Claims, 7 Drawing Sheets

ACTIVE POLLING BY NETWORK LDAP DIRECTORY

FIELD OF THE INVENTION

The present invention relates to the administration of quality of service (QoS) in a network and, more specifically, to a directory server, in combination with client nodes, for actively managing the quality of service of a network.

BACKGROUND OF THE INVENTION

Internet protocol (IP) networks in the present environment tend to be complex and often overloaded. Within this context, it is necessary to develop a framework for providing some level of quality of service (also referred herein as "service quality") in the IP network. A common architecture of an IP-based corporate internet consists of several campus networks connected by a backbone network. The campus networks are typically high-speed local area networks (e.g., Ethernets, Token Rings, etc.) and are relatively free of congestion. The backbone network employs relatively slower links, and is more susceptible to congestion and packet losses. The main cause for such performance problems is that the demand for network bandwidth often exceeds the operating capacity of the backbone network.

One approach to solving the congestion problems in congested portions of a network is to use a reservation protocol, such as RSVP. Reservation protocols offer a service-quality on a per-connection basis, but are relatively complex to implement and exhibit inefficient resource allocation. An alternative approach is to place specialized software components at the edge of the network whose performance needs to be monitored. The specialized software component, or the edge-device, continuously monitors network traffic characteristics and performance. If the network supports means for distinguishing among packets of differing priority, the edge-device transforms the packets flowing into the backbone network in different manners. The edge-device also permits the flow of packets into the network to occur at a specified regulated rate. The different edge-devices in the network communicate with a directory server in the network to obtain information, such as classification rules, policy rules, pacing rates and network state information. The directory server is typically an X.500 directory, which is accessed using Lightweight Directory Access Protocol (LDAP).

The edge-device obtains the rules that determine the level to which a packet belongs by querying the directory server. The query may be made by triggers, such as the establishment of a new connection, or at periodic intervals. The packets are modified so that the routers in the backbone can readily determine the service level of a packet. The edge-devices collect statistics about the traffic flowing through them, and report the statistics to the directory server on triggers, such as expiration timer, or termination of a connection. They also collect performance statistics about packets that are received from the network backbone, and report these statistics to the directory server. In some situations, e.g., when the network is congested, edge-devices may restrict data traffic flow across part of the network below a specific rate. The edge-device obtains the values of the regulated rate by querying the directory server.

The classification rules stored in the directory server determine what service-level will be used for packets belonging to a particular connection. The rules typically specify source/destination IP addresses, source/destination port numbers used by TCP/UDP and the service level associated with this combination. In some networking environments, the classification rules are fairly static and are configured by the network. In other cases, an application may seek to update the rules when it is initiated and/or terminated.

The use of a directory server to manage network state offers several advantages. The directory server acts as a central administration point for network control. Devices in the network can access the information from their local directory, and also store their own information in the directory. Using a protocol such as X.500, the different directory servers regulate the distribution of data into multiple locations. Since directory access protocols offer security and authentication mechanisms, secure communication channels can be readily established.

However, the use of a centrally administered directory and directory server for control of network operations has some performance problems as enumerated below:

(1) Update Lag: An edge-device needs to maintain its classification rules consistent with the classification rules in a directory server capable of storing a large number of entries (e.g., millions of entries). In some cases, the edge-device may not be able to maintain a copy of all the rules, and may need to cache only a small portion of these rules. This portion of the rules depends on the current set of active applications and is likely to be dynamic. Furthermore, the rules stored in the directory server are subject to change. They may be changed by an operator, or applications may request that an update be made to enable them to operate at a specific service-level. Since the change in the rules occurs without the knowledge of the edge-device, there may be latency between the time an edge-device queries the directory for the classification rules (e.g., upon observing the first packet of a connection) and the time when the update occurs. Thus, the edge-device may be operating for some period using out-to-date classification rules.

(2) Server Overload: In order to facilitate improved network control, the edge-device needs to update the information maintained in the directory server about its statistics. When there are hundreds of edge-devices that need to store the information in the directory, the directory server can easily become overwhelmed with the volume of updates. Since each edge-device is operating asynchronously, it is possible for many of them to attempt to update the directory at the same time, and for some to be unable to connect for extended periods of time.

(3) Encrypted Data: When the IP payload is encrypted end-to-end using a protocol such as IP-sec, an intermediate box is unable to obtain information such as port numbers necessary to mark data. However, the intermediate box is responsible for ensuring that an untrustworthy user workstation is not sending improperly marked data in the network.

There is a need to address the problems of server overload when an intermediary edge-device is used to classify packets, and a directory server is used as the site for network administration.

Accordingly, it is an object of the present invention to provide a directory server which eliminates the problems associated with server overload.

It is a further object of the present invention to provide a directory server, which employs polling techniques to remedy the problems associated with server overload.

Another object of the present invention is to provide a method for reducing server overload, which can be easily incorporated into conventional directory servers.

It is also an object of the present invention to provide a directory server, which contacts the client nodes to facilitate the exchange of data with the client nodes.

It is also an object of the present invention to provide a directory server, which reduces the workload of edge-devices in the management of network service quality.

It is a further object of the present invention to provide a directory server, which automatically updates network regulating rules, such as classification rules, of an edge-device.

SUMMARY OF THE INVENTION

The present invention is an apparatus for controlling client node access to data items stored in a storage device, such as a directory. The data items include volatile data items, e.g., data items marked or classified as volatile, such as classification rules, policy rules, port numbers to mark data, etc. The apparatus comprises a communication device for communicating with multiple client nodes; and a processing system, coupled to the storage device, for polling the client nodes to exchange, e.g., retrieve and/or transmit, data related to the volatile data items, via the communication device. The processing system further controls client node access to the data items of the storage device. The processing system preferably restricts client node access requests for the volatile data items maintained in the storage device and allows client node access requests for the data items other than the volatile data items stored in the storage device.

It is important to understand that the directory server contacts the client nodes, and not the reverse, to retrieve and/or transmit data related to the volatile data items in order to update the volatile data items (e.g., classification rules, policy rules, port numbers to mark data etc.) maintained by the directory server and/or the client nodes. The directory server can either communicate with the client nodes over an existing connection or establish a connection with the client nodes to perform communication (if there is no existing connection). The directory server can also contact client nodes to provide information, such as port numbers, necessary to mark data to ensure that an untrustworthy user is not sending improperly marked data in the network. Furthermore, such an arrangement eliminates the need for the client nodes to initiate contact with the directory server to retrieve and/or transmit data related to the volatile data items, thereby reducing the number of directory access requests by the client nodes and the possibility of simultaneous client node access requests at the directory server. Accordingly, the present invention provides a method and apparatus to remedy the problems associated with server overload.

In a preferred embodiment, a directory server dedicates a portion of its communication capacity solely for polling the client nodes to exchange data related to the volatile data items. For instance, if directory server has a maximum receiving/handling capacity of N (e.g., number of simultaneous connections the server can supply), N' (where N' is less than N) of the maximum capacity is dedicated solely for polling the client nodes. The directory server can thus poll client nodes at a rate of N' client nodes at a time, to exchange data. The directory server preferably allows unrestricted client node communication, e.g., client node access requests, on the remaining capacity, N minus N'. Accordingly, the directory server is provided with greater control over the allocation of its communication resources or capacity (e.g., links) and can set priorities for the transmission and retrieval of information related to the data items.

DETAILED DESCRIPTION OF THE INVENTION

Before proceeding with a detailed description of the present invention, it is well to define certain terms to be used herein. The term "volatile" data items generally refers to dynamic data items, such as data items that are to be updated with related data from the client nodes, such as classification rules, policy rules, port numbers to mark data, etc. Volatile data items may also refer to data items that are to be transmitted to client nodes.

Figure 1:
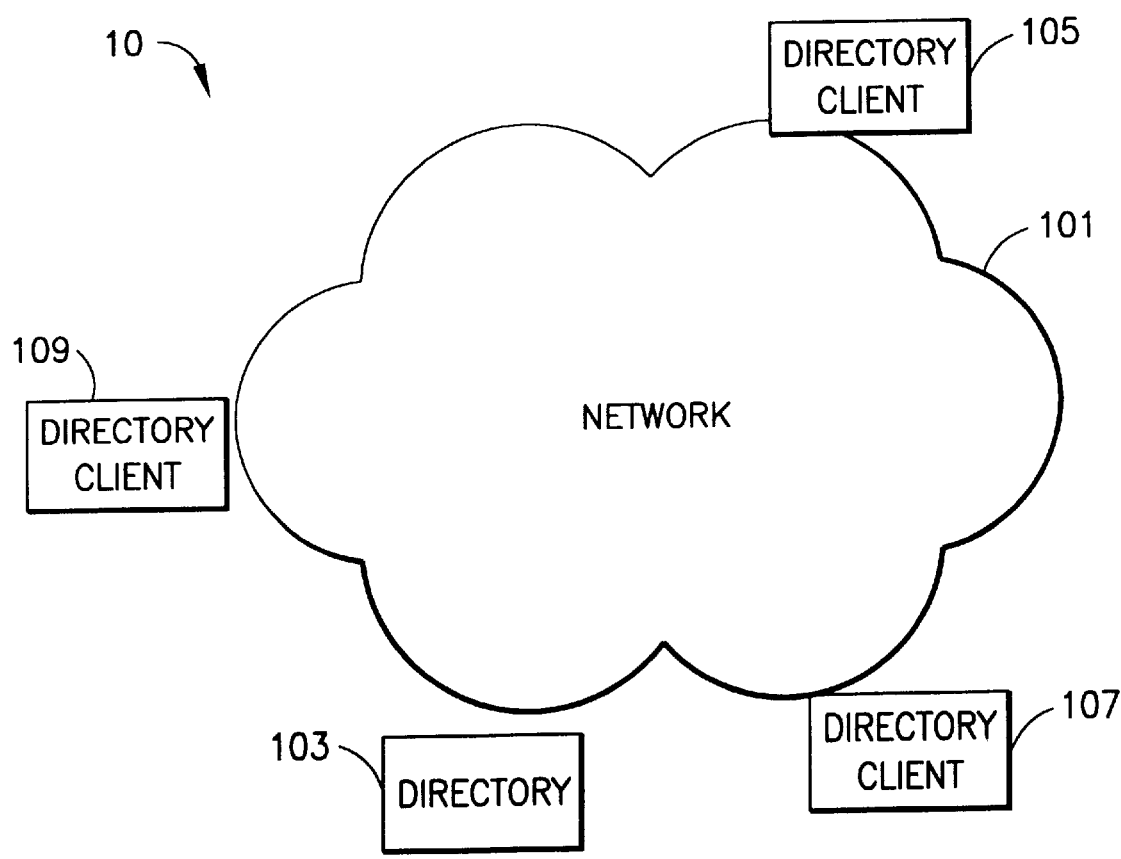
FIG. 1 illustrates a system overview of a network employing a directory server which in combination with client nodes regulate the service quality of the network in accordance with the present invention.

FIG. 1 illustrates a system overview of a network 10 which employs a central administrative directory server for managing the service quality of the network environment, in accordance with the present invention. Network 10 includes a network backbone 101 connected between a plurality of network nodes, including client nodes (e.g., edge devices) generally represented by reference numerals 105, 107, 109 (hereinafter "client(s)") and a directory server 103. Clients 105, 107, 109 interact with directory server 103 across network backbone 101, to regulate the service quality of the network. For instance, clients 105, 107, 109 obtain network regulating information, such as classification rules, to modify data packets passing therethrough so that routers in network backbone 101 can determine the service level of the data packets. Although network 10 is shown as having three client nodes, the network may include any number of client nodes.

In order to reduce problems associated with server overload, it has been discovered that directory server 103 can be configured to contact the client nodes to exchange (e.g., retrieve and/or transmit) information related to data items stored in directory server 103. In particular, directory server 103 polls client nodes 105, 107 and 109 to exchange such information, at periodic intervals or upon the occurrence of a triggering event. This may be accomplished over existing connections or new connections established by the directory server. Such an arrangement obviates the need for the client nodes to contact the directory server for such information, thereby reducing the possibility of server overload.

Figure 2:
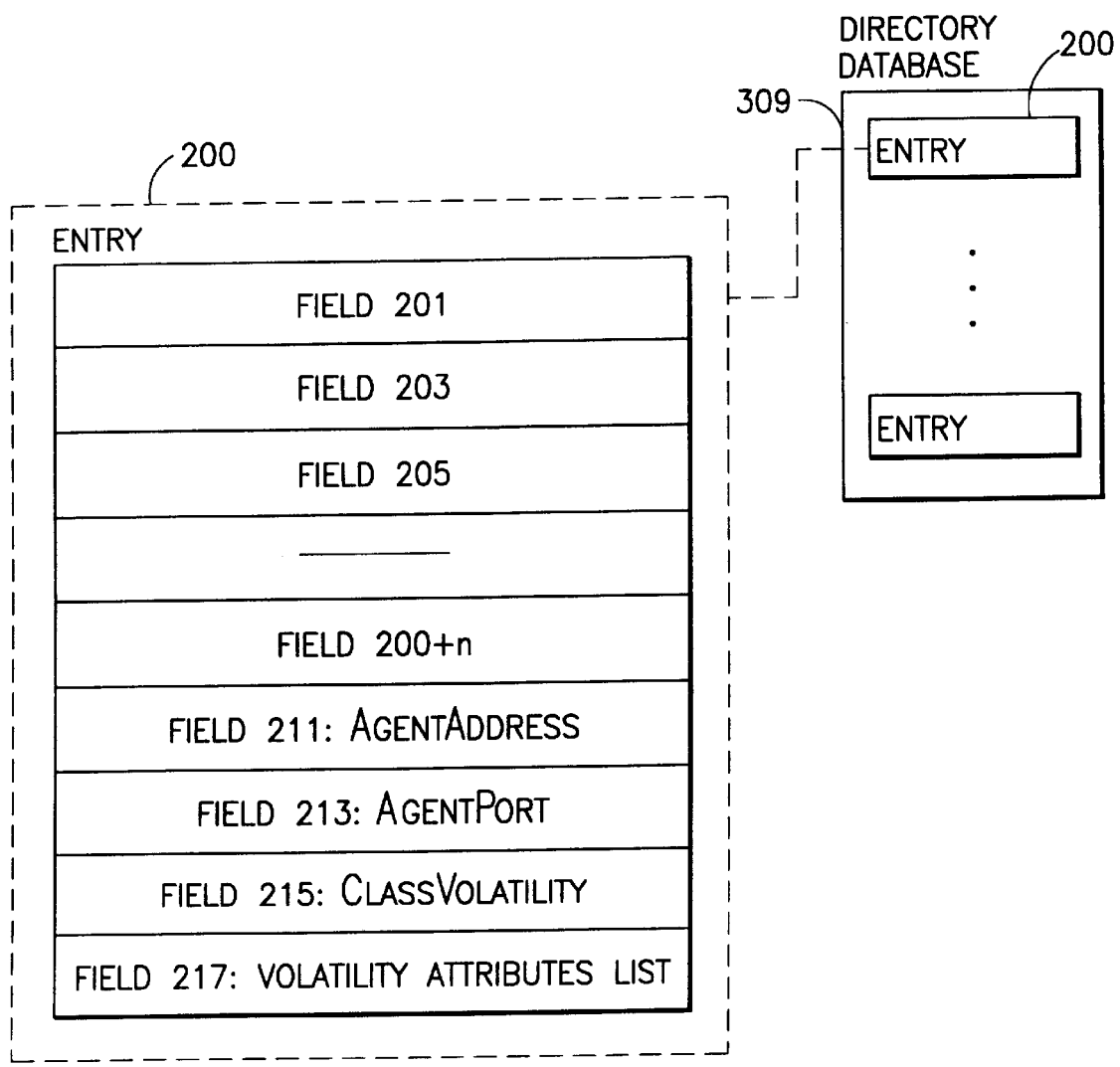
FIG. 2 illustrates a directory database of the directory server of FIG. 1 in accordance with the present invention.

FIG. 2 illustrates a directory database 309 of directory server 103 for storing directory information, e.g., data items or objects, in a plurality of entries 200. Each entry 200 includes multiple fields specifying properties of that entry. For instance, each entry 200 includes a plurality of fields, e.g., fields 201 through 202, which specify properties about the entry that are the same as would be maintained by a state-of-the-art-directory.

Each entry 200 also includes a field 215 referring to a ClassVolatility field, which specifies if the entry is considered volatile or non-volatile. The volatility of a field, a class of fields or entries (generally referred to as a data items(s)) is dependent on various factors, such as the popularity of the field (e.g., an amount of client node access requests for the particular field). If an entry 200 is marked as volatile in ClassVolatility field 215, the entry would include additional fields, such as a field 211 (AgentAddress field) containing the network address (e.g., SERVER.WATSON.EDU: 8000 in which the number 8000 indicates the port number) of a directory client which would be responsible for generating and/or maintaining the update information related to the entry. It is preferred that ClassVolatility Field 215 stores a boolean attribute to mark the volatility of the entry, but may store any type of information for marking the volatility of the entry.

For a given entry 200, it is preferred that only a subset of the fields are arranged to be volatile. A list of the volatile fields can be maintained in a field 217, generally referred herein as a Volatile-Attribute-List (VAL) field. Directory server 103 can access VAL field 217 to determine which fields of entry 200 need to be updated with data from the client nodes or contain data for updating the client nodes. If VAL field 217 is not specified, but ClassVolatility field 215 marks the entry as volatile, then all the fields in the entry are considered volatile. Otherwise, only the fields specified in VAL field 217 are considered volatile. Accordingly, fields 215 and 217 provide a simple and flexible approach to mark either selected fields or all fields of an entry as volatile. Although the above describes one approach for marking fields of entry 200 as volatile, other marking techniques may also be employed to accomplish the same.

Note that directory information stored in directory database 309 may include network regulating rules, such as classification rules, policy rules, pacing rules, general network state information, client statistics, and/or any other type of information necessary to regulate the service quality of a network. The term "classification rules" generally refers to selected information or data, maintained in a directory server, which determines what service-level will be used for packets belonging to a particular connection. Such rules typically specify source/destination IP addresses, source/destination port numbers used by TCP/UDP, and the service level associated with this combination. The directory information may also include client information, such as employee identifiers, phone numbers, application programs or pathways to access such application programs, private keys, a list of the equipment in the network, a list of the properties of the network, or any other type of centrally maintained information.

Figure 3:
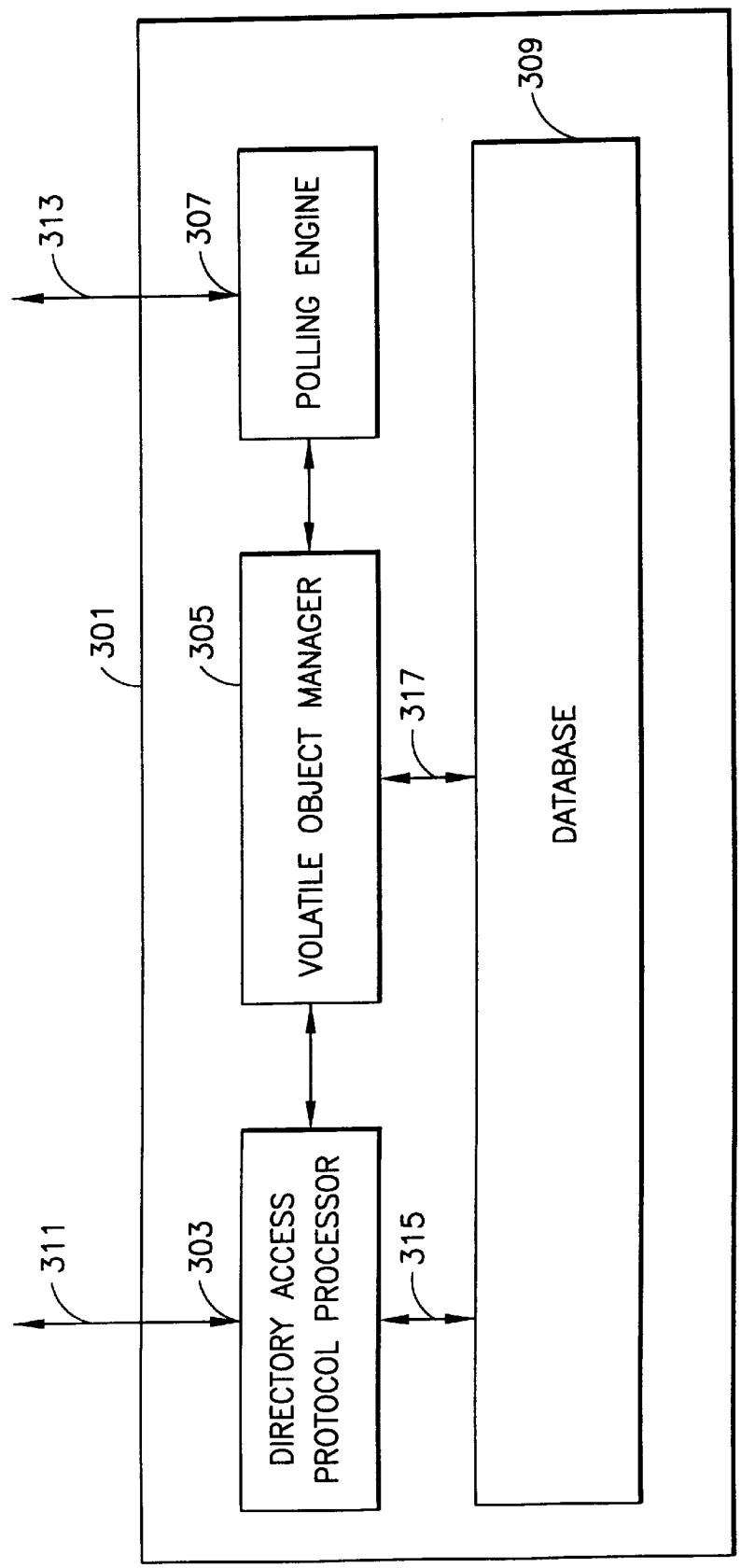
FIG. 3 illustrates a directory server adapted to perform active polling in accordance with the present invention.

FIG. 3 illustrates a block diagram of directory server 103 for polling client nodes 105, 107 and 109 to exchange updated data related to volatile data items stored in directory database 309 and/or the client nodes (e.g., fields). Directory server 103 includes an access protocol processor 303 for controlling access to data items maintained by directory database 309. Directory access protocol processor 303 communicates with client nodes (generally shown as 105, 107 and 109 of FIG. 1), through the use of a standard access protocol 311, such as a Lightweight Directory Access Protocol (LDAP). Directory access protocol processor 303 converts requests from client nodes 105, 107 and 109 into directory database access requests. Such requests are performed according to a protocol, such as Standard Query Language (SQL), generally denoted as 315 which is associated with database 309. It is preferred that directory server 103, particularly directory access protocol processor 303, is configured to restrict client node access requests for volatile entries and to allow such requests for non-volatile entries.

Directory database 309 stores directory information preferably in a manner shown in FIG. 2. Directory database 309 may be a database, such as DB2 (a trademark of the International Business Machines Corporation) or Oracle (a trademark of Oracle Corporation). Other commonly used databases can also be employed as the backends of directory server 103. The protocol employed by directory access protocol processor 303 to access and modify (i.e., update, delete or create a new entry) directory database 309 is generally known in the art and will not be described in further detail herein.

Directory server 103 also includes a volatile object manager 305 for monitoring, tracking and accessing volatile data items that are maintained in directory database 309. Such volatile data items have their volatility indication marked true. For instance, a volatile entry 200 has ClassVolatility field 215 marked as true, or a volatile field of entry 200 is listed in VAL field 417 of entry 200 (as shown in FIG. 2). As shown in FIG. 3, volatile object manager 305 is coupled between directory access protocol processor 303, polling engine 307 and directory database 309. Volatile object manager 305 interacts with directory database 309 using a database-specific protocol 317, which is preferably identical to protocol generally denoted by the reference numeral 315 used by directory access protocol processor 303. Directory access protocol processor 303 and polling engine 307 work in combination with volatile object manager 305 to control client node access to selected data items of directory database 309 and to poll client nodes to exchange data related to selected data items, e.g., volatile data items.

Polling engine 307 is employed to contact or, more specifically, to poll client nodes 105, 107 and 109 of directory server 103 to facilitate the exchange of updated class information or data related to the volatile data items between directory server 103 and client nodes 105, 107 and 109. This is accomplished through the use of a protocol extension, generally denoted by the reference numeral 313, which is discussed below with respect to FIGS. 6 and 7. Polling engine 307 can be configured to poll client nodes 105, 107 and 109 at periodic intervals or upon the occurrence of a triggering event.

For a directory server 103 having a maximum receiving/handling capacity of N (e.g., a number of simultaneous connections the server can supply), it is preferred that N' of N receiving/handling capacity is dedicated for polling client nodes 105, 107 and 109 (where N' is less than N). Polling engine 307 preferably polls N' client nodes at a time for data related to the volatile data items. The remaining N minus N' of handling capacity is preferably employed for unrestricted client node access to the data items.

Figure 4:
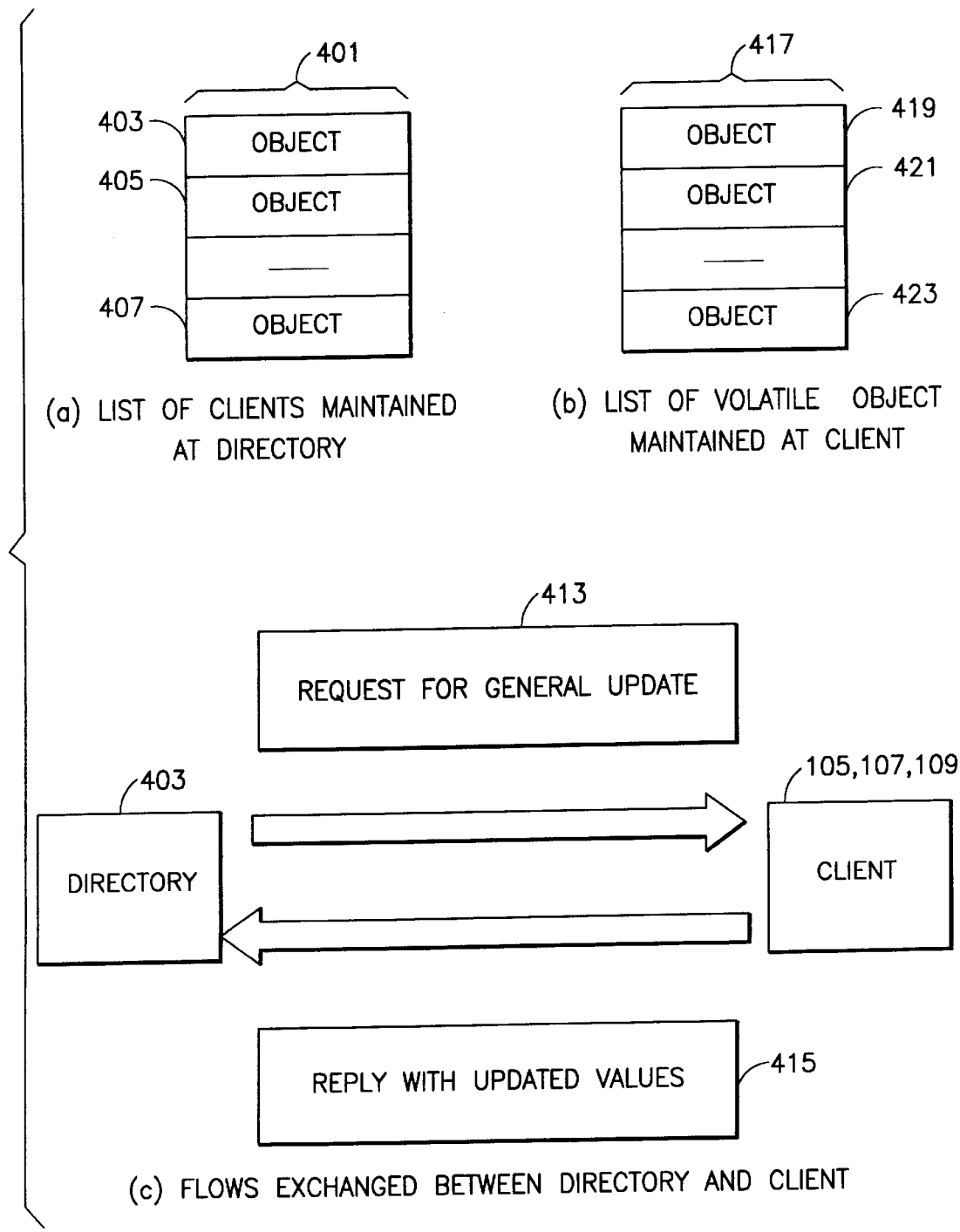
FIG. 4 illustrates a first embodiment in which a directory server automatically interacts with client nodes to facilitate active polling.

FIG. 4 illustrates a first embodiment of directory server 103 exchanging polling information with client nodes 105, 107 and 109. FIG. 4(a) illustrates a block diagram of a client list 401 of client nodes 105, 107 and 109 that are responsible for managing one or more volatile data items in the system. List 401 includes client identifiers generally denoted by the reference numerals 403, 405, 407 and so forth. Each client identifier 403, 405 and 407 includes a host name or a host address and a port number to contact a particular client node 105, 107 and 109. Client list 401 can be maintained in volatile object manager 305 (FIG. 3), directory database 309 or at any location accessible by volatile object manager 305.

As shown in FIG. 4(b), each client node 105, 107 and 109 maintains a list 417 of data items to be transmitted to directory server 103 to update data items stored in directory database 309. List 417 includes several data items, for example, data items 419, 421, 423, etc. Referring to FIG. 4(c), there is shown a data flow exchange diagram between directory server 103 and a client node, for example, client node 105. When directory server 103 polls client node 105, the directory server establishes a new connection, if necessary, to the network address of client node 105, and transmits a request 413 to transmit the data items on list 417, such as those related to data items stored in directory database 309. Client node 105 receives request 413 and transmits a reply 415 that includes a list of all the updated data items to directory server 103. After reply 415 is received by directory server 103, the connection is terminated.

Figure 5:
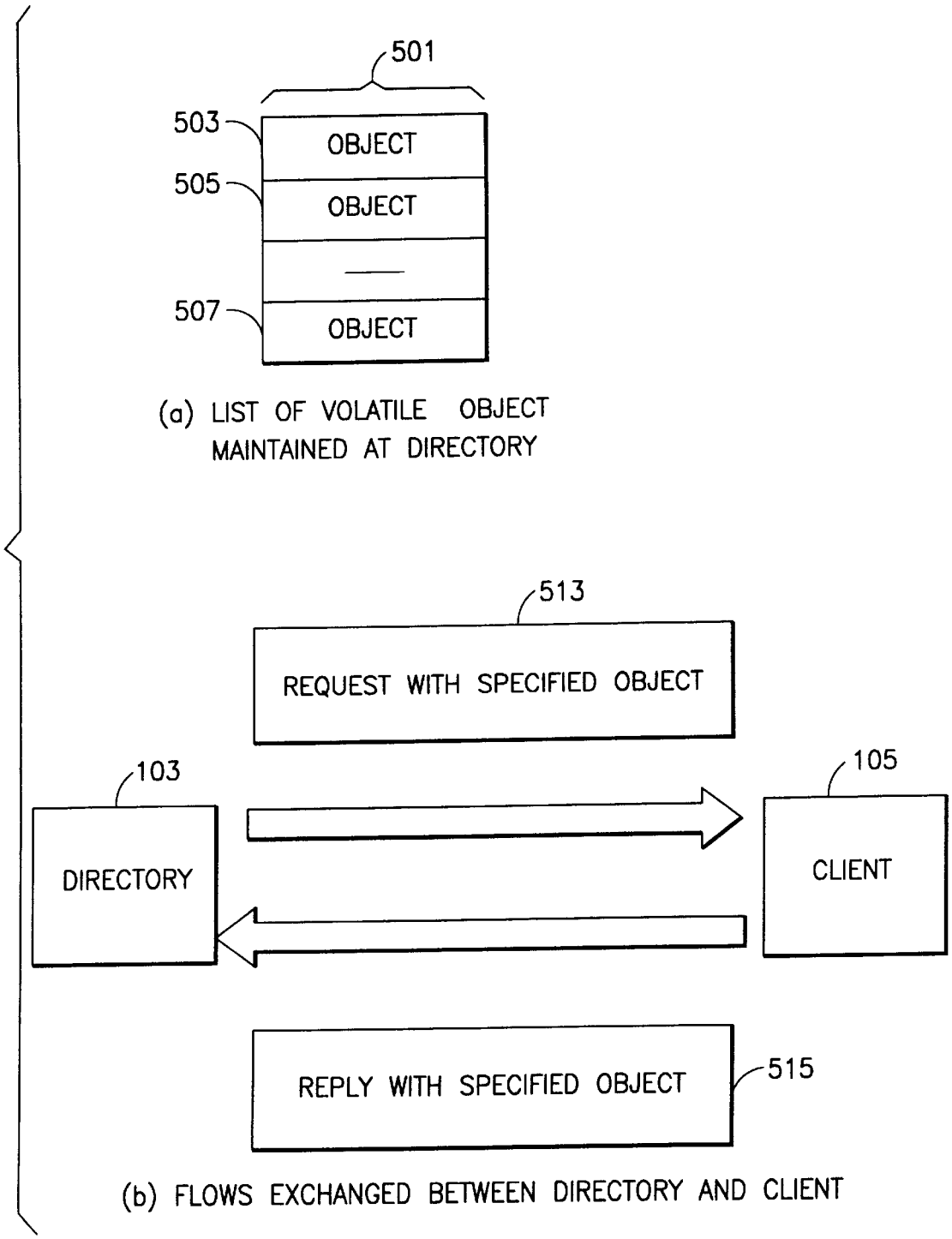
FIG. 5 illustrates a second embodiment in which a directory server automatically interacts with client nodes in order to facilitate active polling.

FIG. 5 illustrates a second embodiment for exchanging polling information between directory server 103 and client nodes 105, 107 and 109. FIG. 5(a) illustrates a block diagram of a list 501 of data items that are marked as volatile in directory database 309. List 501 includes a plurality of entries 503, 505, 507, etc. List 501 is preferably maintained in volatile object manager 305, or at any location accessible by volatile object manager 305.

In this embodiment, no information is maintained explicitly at client nodes 105, 107 and 109. At periodic intervals or upon the occurrence of a triggering event, directory server 103 contacts each client node 105, 107 and 109 to conducts message exchanges, such as client node 105 as shown in FIG. 5(b). For instance, directory server 103 transmits to client node 105 a request message 513 that enumerates the data items to be updated. Client node 105 replies with a reply message 515 that contains the updated information related to all data items specified in request message 513.

Figure 6:
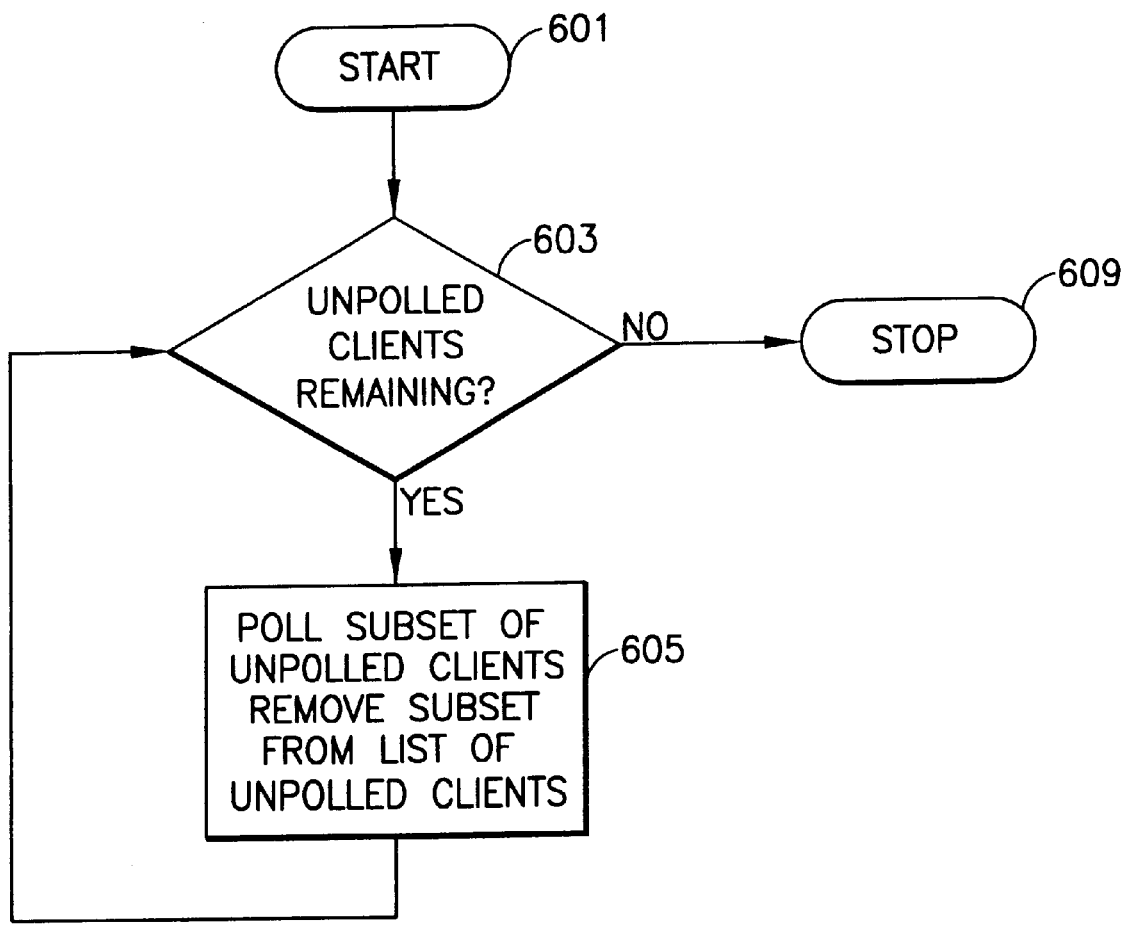
FIG. 6 illustrates a flow diagram of a polling scheme employed by a directory server of the present invention.

FIG. 6 illustrates a flow diagram of a polling action implemented by polling engine 307 of directory server 103 to interact with client nodes 105, 107 and 109. Polling engine 307 initiates the polling action at predetermined times, periodically, or upon an occurrence of a triggering event (Step 601). At step 603, polling engine 307 checks if all client nodes 105, 107 and 109 have been polled in this round. If so, polling engine 307 terminates the polling action (Step 609). Otherwise, in step 605, a subset of client nodes 105, 107 and 109 are polled in parallel. During the polling action, entries 200 of directory database 309 are updated. Polling engine 307 then loops back to step 603 to determine whether more client nodes 105, 107 and 109 remain to be polled. The process terminates when all client nodes 105, 107 and 109 have been polled (Step 609).

Figure 7:
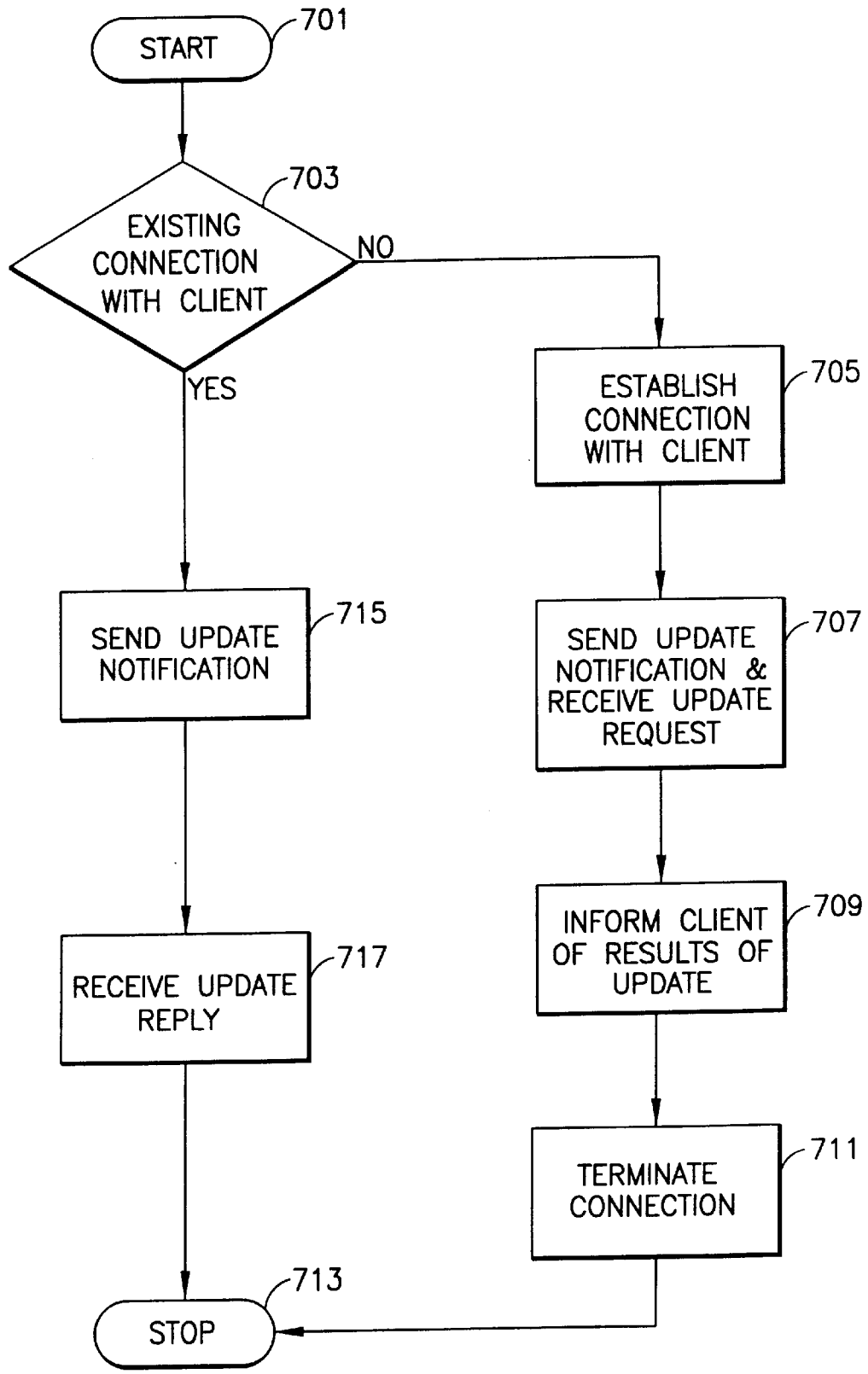
FIG. 7 illustrates a more detailed flow diagram of a polling scheme employed by a directory server of the present invention.

FIG. 7 illustrates a flow diagram of a process performed in Step 605 of the polling process of FIG. 6. Polling engine 307 initiates the process of exchanging (e.g., retrieving or transmitting) data related to the volatile data items with client nodes 105, 107 and 109 (Step 701). Polling engine 307 checks whether a connection already exists with a particular client node, for example, client node 105 (Step 703). If not, polling engine 307 establishes a new connection with client node 105 (Step 705) and transmits an Update Notification Request to client node 105 (Step 707). Client node 105 replies by sending an update request to directory server 103. Upon receipt of the update request, directory server 103 modifies or updates its entries 200 in step 709, and sends back the results of the update notification. Thereafter, the connection is terminated in step 711, and polling engine 307 terminates the process (Step 713).

If a connection already exists with client node 105, polling engine 307 transmits an update notification to client node 105 (Step 715). Client node 105 then transmits an update reply, via the existing connection, which includes data for updating data items of directory database 309 (Step 717). Thereafter, polling engine 307 terminates the exchange process in step 713.

In summary, the present invention provides a directory server that contacts or, more specifically, polls client nodes to exchange data related to selected data items, e.g., volatile data items. The present invention also provides a directory server that controls client node access to the data items, e.g., restricting client node access requests for selected data items. The present invention further provides a directory server that dedicates a portion of its communication capacity for the purpose of polling the client nodes.

The invention having thus been described with particular reference to the preferred forms thereof, it will be obvious that various changes and modifications may be made therein without departing from the spirit and scope of the invention as defined in the appended claims.

What is claimed is:

1. An apparatus for controlling client node access to data items, said data items including volatile data items, said apparatus comprising:

storage means for storing said data items;

communication means for communicating with a plurality of client nodes; and processing means, coupled to said storage means,
  (i) for controlling client node access to said data items of said storage means, and
  (ii) for polling said client nodes to exchange data related to said volatile data items, via said communication means, wherein said client nodes exchange said data related to said volatile data items only through polling; and wherein said communication means has a maximum handling capacity N for said data items to be undated, N' of said capacity N being dedicated to exchanging said data related to said volatile data items, said processing means polling N' of said client nodes at a time to exchange data related to said volatile data items.

2. The apparatus as recited in claim 1, wherein said processing means enables client node access to data items other than said volatile data items stored in said storage means.

3. The apparatus as recited in claim 1, wherein said processing means restricts client node access for said volatile data items stored in said storage means.

4. The apparatus as recited in claim 1, wherein said processing means polls selected client nodes having said data related to said volatile data items to retrieve said data.

5. The apparatus as recited in claim 4, wherein said processing means updates said volatile data items stored in said storage means through the use of said data.

6. The apparatus as recited in claim 5, wherein said data includes client node statistics.

7. The apparatus as recited in claim 1, wherein said client nodes store selected data items of said volatile data items, said processing means polling said client nodes to update said selected data items stored at said client nodes with related data items stored in said storage means.

8. The apparatus as recited in claim 1, wherein said processing means polls said client nodes at periodic intervals.

9. The apparatus as recited in claim 1, wherein said processing means polls said client nodes upon a triggering event.

10. The apparatus as recited in claim 1, wherein said storage means includes means for classifying a data item of said data items as a volatile data item.

11. The apparatus as recited in claim 10, wherein said storage means includes means for classifying a group of data items as said volatile data items.

12. The apparatus as recited in claim 1, wherein a remaining capacity of N minus N' of said communication means is dedicated to data items other than said volatile data items.

13. The apparatus as recited in claim 1, wherein said data items are selected from the group consisting of policy rules, pacing rules, general network state information and classification rules.

14. The apparatus as recited in claim 1, wherein said processing means further causes said communication means to establish a new connection with any of said client nodes not having an existing connection.

15. A network system including the apparatus of claim 1 coupled to said client nodes across a network backbone, wherein said apparatus and said client nodes cooperate to regulate traffic across said network backbone.

16. A method for controlling access, at a directory node, by client nodes of data items maintained by said directory node, said data items including volatile data items, said method comprising the steps of:
   (a) identifying said volatile data items from said data items; and
   (b) polling said client nodes to exchange data related to said volatile data items, wherein said client nodes exchange said data related to said volatile data items only though said step (b);

wherein, said volatile data items are further classified into a plurality of classes according to their volatility, said step of polling successively polling said client nodes for each class of said volatile data items; and wherein said directory node has a maximum receiving/handling capacity N of the total said data items, said step of polling including the step of:
   (c) allocating N' of said capacity to the most volatile class of said volatile data items, wherein N' is less than N;
   (d) contacting said client nodes at a rate of N' client nodes at a time to exchange data related to said most volatile class of said data items;
   (e) repeating steps (c) and (d) for every other selected class.

17. The method as recited in claim 16, further comprising the step of allowing unrestricted client node access to said data items other than said volatile data items.

18. The method as recited in claim 16, further including the step (f) of allowing unrestricted client node access to said client nodes on a remaining capacity of N minus N'.

19. The method as recited in claim 16, wherein the step (b) includes the step of establishing a new connection with any of said client nodes not having an existing connection.

20. The method as recited in claim 16, wherein the step (b) polls at least one of said client nodes over an existing connection with said at least of said client nodes.

* * * * *